(12) United States Patent
Weiefors

(10) Patent No.: US 11,214,302 B2
(45) Date of Patent: Jan. 4, 2022

(54) METHOD FOR THE CONTROL OF VEHICLE STEERING

(71) Applicant: Sentient IP AB, Gothenburg (SE)

(72) Inventor: Henrik Weiefors, Gothenburg (SE)

(73) Assignee: SENTIENT IP AB, Gothenburg (SE)

( * ) Notice: Subject to any disclaimer, the term of this patent is extended or adjusted under 35 U.S.C. 154(b) by 606 days.

(21) Appl. No.: 16/081,724

(22) PCT Filed: Apr. 17, 2017

(86) PCT No.: PCT/SE2017/050382
§ 371 (c)(1),
(2) Date: Aug. 31, 2018

(87) PCT Pub. No.: WO2017/184064
PCT Pub. Date: Oct. 26, 2017

(65) Prior Publication Data
US 2019/0061809 A1    Feb. 28, 2019

(30) Foreign Application Priority Data
Apr. 18, 2016  (SE) .................... 1630093-1

(51) Int. Cl.
*B62D 6/00*   (2006.01)
*B62D 15/02*  (2006.01)
(Continued)

(52) U.S. Cl.
CPC .............. *B62D 6/008* (2013.01); *B62D 5/00* (2013.01); *B62D 5/0463* (2013.01); *B62D 5/062* (2013.01); *B62D 15/025* (2013.01)

(58) Field of Classification Search
CPC ........ B62D 5/008; B62D 5/00; B62D 5/0463; B62D 5/062; B62D 15/025
See application file for complete search history.

(56) References Cited

U.S. PATENT DOCUMENTS 9,260,092 B1    2/2016  Lombrozo
2004/0186641 A1*  9/2004  Hironaka .................. H02P 7/04
                                                    701/42
(Continued)

FOREIGN PATENT DOCUMENTS

CN    103895693        7/2014
WO    2017/135884 A1   8/2017

OTHER PUBLICATIONS

Decision to Grant in corresponding European Patent Application No. 17718757.2 dated May 4, 2020, pp. 1-2.
(Continued)

*Primary Examiner* — Jacob D Knutson
(74) *Attorney, Agent, or Firm* — Jeffrey S. Melcher; Melcher Patent Law PLLC

(57) ABSTRACT

Methods of controlling a feedback torque actuator in a steering system that includes the feedback torque actuator and an assistance actuator incorporate, for feedback torque control, generating at least one input signal with a sensor, determining a steering angle from the input signal, transforming the steering angle to a target steering-wheel torque, and controlling the feedback torque actuator via a closed loop current control to achieve the target steering-wheel torque. The assistance actuator has a high gain, thereby resulting in a low torque in the axle above the assistance actuator such that the steering-wheel torque is close to the target steering-wheel torque, whereby acceptable steering feel is achieved.

3 Claims, 2 Drawing Sheets

(51) Int. Cl.
  *B62D 5/00* (2006.01)
  *B62D 5/04* (2006.01)
  *B62D 5/06* (2006.01)

(56) References Cited

U.S. PATENT DOCUMENTS

| | | | | |
|---|---|---|---|---|
| 2007/0144824 A1* | 6/2007 | Tamaki | ............... | B62D 6/008 |
| | | | | 180/446 |
| 2007/0192005 A1* | 8/2007 | Ishikawa | ............ | B62D 5/008 |
| | | | | 701/41 |
| 2007/0199764 A1* | 8/2007 | Kifuku | ............... | B62D 5/049 |
| | | | | 180/446 |
| 2007/0256885 A1 | 11/2007 | Ammon | | |
| 2008/0066994 A1* | 3/2008 | Fujita | ............... | B62D 5/0463 |
| | | | | 180/446 |
| 2014/0238770 A1* | 8/2014 | Namikawa | ......... | B62D 6/008 |
| | | | | 180/446 |
| 2015/0329141 A1 | 11/2015 | Preijert | | |
| 2018/0188705 A1 | 7/2018 | Linger | | |

OTHER PUBLICATIONS

Office Action issued in corresponding Chinese Patent Application No. 201780024423.9, dated Jun. 16, 2020, pp. 1-8, with translation pp. 1-3.
EPO, Int'l Search Report in PCT/2017/050382, dated Jul. 17, 2017.
EPO, Written Opinion in PCT/2017/050382, dated Jul. 17, 2017.

* cited by examiner

METHOD FOR THE CONTROL OF VEHICLE STEERING

TECHNICAL FIELD

The present invention relates to a method for controlling a feedback torque actuator in a steering system, comprising said feedback torque actuator and an assistance actuator.

The invention also relates to a corresponding device as well as a system for controlling a feedback torque actuator in a steering system.

BACKGROUND OF THE INVENTION

Heavy vehicles and farming vehicles such as e.g. tractors require great steering assistance levels. Therefore, the assistance actuators of today are predominantly hydraulic assistance driven (because the fact that hydraulics has high power density). That means that if one would like greater controllability than standard hydraulic assistance valves result in, for functions such as e.g. Lane Keeping Aid (LKA), it is possible to add an electric assistance actuator above the hydraulic actuator.

This means that there will be two assistance actuators when passenger vehicles of today only need an electric assistance actuator, for solving the whole control problem (both power assistance and controllability for e.g. LKA). Having two assistance actuators in series means that it is normally required to use two torsion bars (for measuring the torque column) in series, which leads to the fact that the column stiffness becomes approximately half its stiffness compared to only one torsion bar. A weak column gives a poor response in control because the driver will have to twist the column before the vehicle begins to turn. As if this is not enough, a torque sensor is expensive.

A completely different set of problems with power assistance is the conflict of assistance and disturbances. If there is high assistance, the driver will have great noise suppression, but too light steering, which will give bad steering feel. On the other hand, having a low assistance, the driver will have good torque build-up and good steering feel at the expense of noise suppression, i.e. the driver will have a steering that suffers from torque steer, kick-backs (such as forces from e.g. pot-holes that normally will be transferred through the steering system and "kick" the steering wheel away a certain angle) and other disturbances (that typically ranges from vibrations from uneven road surface such as e.g. longitudinal ruts to vibrations induced by poor wheel balancing).

Current state-of-the-art steering systems and steering feel for heavy vehicles, construction equipment and tractors suffer from the above-mentioned problems.

In order to solve the problem of having both good feedback, good response and controllability for e.g. LKA with a less complex system, we propose a new system design and a new control method based on the following principles incorporating the following method steps for the feedback torque control:
- measurement of at least one input signal with the aid of a sensor,
- determination of a steering angle from the above-mentioned input signal,
- transformation of the above-mentioned input signal of a steering angle to a target steering-wheel torque, and
- control of the mentioned feedback torque actuator via a closed loop current control to achieve said target steering-wheel torque, and give the above-mentioned assistance actuator a very high gain resulting in the fact that the torque in the axle above this assistance actuator is so low that the steering-wheel torque will be close to the above-mentioned target steering-wheel torque whereby acceptable steering feel is achieved.

The method steps mentioned makes it possible to make use of only one single torsion bar. Further it gives the driver a disturbance free steering feedback.

SUMMARY OF THE INVENTION

To create a solution to remedy the above-mentioned problems it is proposed that:
- The hydraulic actuator is tasked to have such a high assistance (high gain of boost-curve) that the torque above the hydraulic torque assistance actuator is very low. The aim is to remove as much of the external torque (coming from wheel forces) as possible. Thus, any disturbances is removed already above the hydraulic torque assistance actuator.
- The electric feedback torque actuator is tasked to create the steering feel envisaged. As there is now no torque in the column axle below the feedback torque actuator (because the hydraulic assistance actuator removes them), the steering feel is created entirely by requesting the assistance that corresponds to the target steering torque that are in demand right now (by steering feel reasons). Steering feel is created using a mathematical model based on the steering angle and vehicle speed. Now, it is possible as a result of the fact that if you know the steering torque you want based on the steering angle and vehicle speed there is no need for a torsion bar and no torsion-bar torque sensor. The torque you want to achieve from the mathematical model can be controlled directly from the electric motor through a standard motor current control. To control the steering angle for e.g. LKA, the electric actuator position is controlled (against a target value of the steering angle).

In summary these are the benefits of the current invention:
- Disturbance rejection (such as e.g. torque steer, kick-backs and other disturbances).
- Good steering feel with torque build-up, straight-ahead position and the steering-wheel returnability.
- High column stiffness because of only one torsion bar resulting in a better vehicle response as the deflection between the steering wheel and the road wheels will be less.
- Low cost due to the absence of one torsion-bar torque sensor.
- Controllability for steering angle control by functions such as e.g. LKA.

This purpose is achieved with a method for controlling a steering system for a vehicle as recited in the claims.

DEFINITIONS

Actuators

A steering feedback torque actuator is an actuator, which can be used to influence either the steering-wheel torque or the steering-wheel angle or the steering angle.

An assistance actuator is an actuator, which can be used to assist as a servo so that the torque in the axle above said assistance actuator is less than the torque below the actuator. The servo assistance is made by boost-curve control, where a boost curve is a non-linear gain for the level of assistance as a function of the torque in the axle above said assistance actuator.

An actuator is a mechanism or a system that is operated mechanically or by an ECU and converts a source of energy, typically electric current, hydraulic fluid pressure, or pneumatic pressure, into a motion, force or torque.

Vehicle States

A state is defined as a translational or rotational position, velocity or acceleration, or from these before-mentioned states derived states such as e.g. a vehicle slip angle, which is the angle between the vehicle local x-axis and the vehicle speed vector.

A steering angle is an angle in the steering system that influences the lateral acceleration or curvature of the vehicle, measured somewhere in the steering system. Such steering angles can be:

The front-wheel angle.
The articulation angle of an articulated vehicle.
The rear-wheel steering angle in the case of a rear-wheel steered vehicle.
A combination of the front-wheel angle and the rear-wheel angle in the case of an all-wheel steered vehicle.

A torsion-bar torque is a torque measured by the use of a sensor that is sensitive to a twist of a specific torsion bar that is mounted somewhere in the steering column.

A steering-wheel torque is the torque applied by the driver to the steering wheel. This steering-wheel torque is normally approximated by the torsion-bar torque.

A driver torque is equal to a steering-wheel torque.

Electric Architecture

A signal bus is a transmission path on which signals can be read and/or transmitted.

An input signal can for example be the measure of a torque applied by the driver via the steering wheel, measured somewhere between the steering wheel and the wheel, or a signal derived from this quantity.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Control Theory

Controllability describes the ability of an external input to move the internal state of a system from any initial state to any other final state in a finite time interval.

Transformation is defined as a mathematical function or lookup table with one or more input values used to produce one or more output values.

A steering-wheel torque measurement is a torque measured in the steering column or steering wheel or a force measured in the steering rack times the torque ratio between the steering rack and the steering wheel.

Frequency blending is a weighted sum in the frequency domain of two signals such that one of the signals is filtered by a certain filter and the other is filtered by a complementary filter. An example of frequency blending is to use a linear first order low-pass filter on one of the two signals and a linear first order high-pass filter on the other and the result of the two filters are summed together.

A complementary filter is a filter such that sum of the complementary filter and the filter that it is complementary to is one over the whole frequency range.

Vehicle Dynamics

A vehicle model is a mathematical model that transforms a road-wheel angle and a vehicle speed to a number of vehicle yaw and/or lateral states, namely vehicle yaw rate and acceleration, vehicle lateral speed and acceleration and vehicle body sideslip angle.

Steering Feel

A torque reference generator is a steering feel control concept where the target steering-wheel torque is calculated in a reference generator, and this reference steering-wheel torque is then used to actuate the steering feedback actuator to this reference torque.

Reference Generator Sub-Functions

A lateral acceleration feedback torque is a torque felt by the driver that corresponds to the lateral acceleration of the vehicle.

A tyre friction torque is the friction between the tyres and the road or a model of this friction.

A steering system friction or a friction torque is the friction of the parts of the linkage of the steering system or a model of this friction.

A damping torque occurs owing to damping of the tyres and the steering system or a model of this damping.

A returnability torque comes from the geometry of the steering system or a model of the steering system.

These torque contributions can be vehicle speed dependent. The torque contributions can also be calculated via mathematical models or sensed via sensors in the vehicle or steering system.

A target steering-wheel torque is the sum of the lateral acceleration feedback torque, the above-mentioned tyre friction torque, the friction torque, the damping torque and the returnability torque.

The parts of the target steering-wheel torque are calculated from mathematical models of the different torque parts.

The lateral acceleration torque is calculated from a bicycle model, which uses vehicle speed and steering angle as input, and give the lateral acceleration as output. The lateral acceleration feedback is a function of the lateral acceleration calculated from the vehicle model.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function.

The model of the tyre friction is the combination of the hysteresis and the relaxation so that e.g. an increase owing to the hysteresis torque can happen at the same time as the torque decrease owing to the relaxation. The resulting torque of the model is the sum of the two parts.

The mathematical model of the friction torque is a model of an angle or angular speed driven hysteresis. The maximum torque in the hysteresis can be shaped by a function so that the maximum torque is different on centre compared to off centre.

The mathematical model of the damping torque consists of a damping constant times an angular speed or translational speed, such as e.g. the rack velocity, measured somewhere in the linkage, where the linkage is either mechanical or hydraulic, between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

The returnability torque is a vehicle speed dependent and steering-wheel angle or steering angle dependent torque.

BRIEF DESCRIPTION OF THE FIGURE

The invention will hereinafter be described in greater detail, with reference to the preferred embodiments, schematically shown in the enclosed drawing. We will therein also describe the signal flow and also the elementary calculation steps for a steering control according to the invention.

FIG. 1 is a schematic figure of a steering system (100). There is a linkage between the front axle road wheels (127) and the steering assistance actuator (140). The linkage consists of a steering rack (124) with associated tie rods (125) connected via a pinion (122) to the steering assistance actuator (140). The steering assistance actuator consists of a hydraulically assisted steering rack (126) (or similar in the case of Pitman arm based steering systems or Orbitrol valves in tractors or construction equipment). The steering column incorporates a torsion bar (128) with a torque sensor (6) for measuring the steering torque above the assistance actuator. The feedback torque is actuated by a steering feedback actuator (130), which consists of an assistance motor (20) and an ECU. The driver applies the driver torque, To, in the steering wheel (120). Between the steering feedback actuator (130) and the steering assistance actuator (140), there is a column axle (135).

DETAILED DESCRIPTION OF PREFERRED EMBODIMENTS

Figure 1:
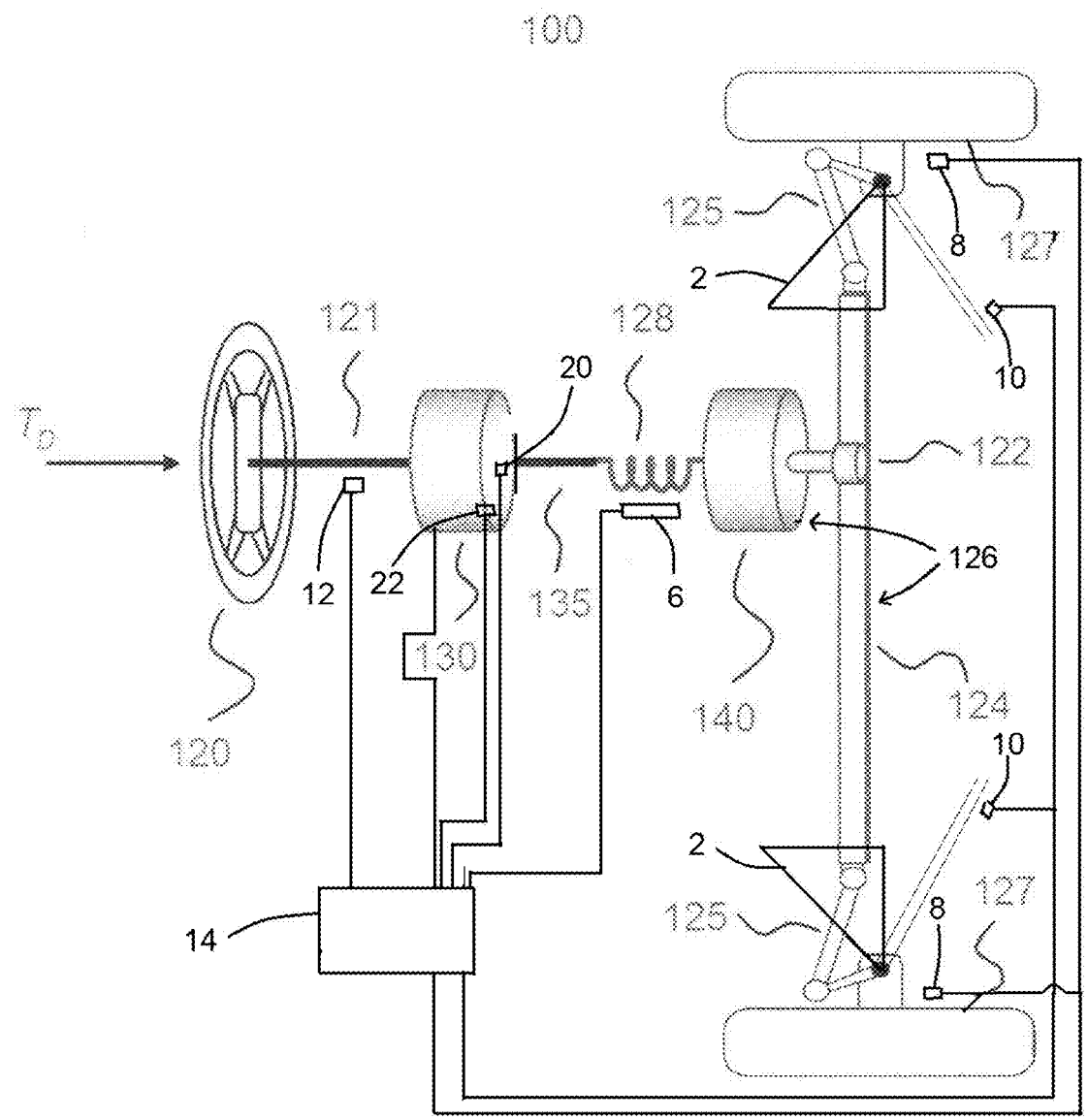
FIG. 1. Steering system with electric and hydraulic assistance.
Figure 2:
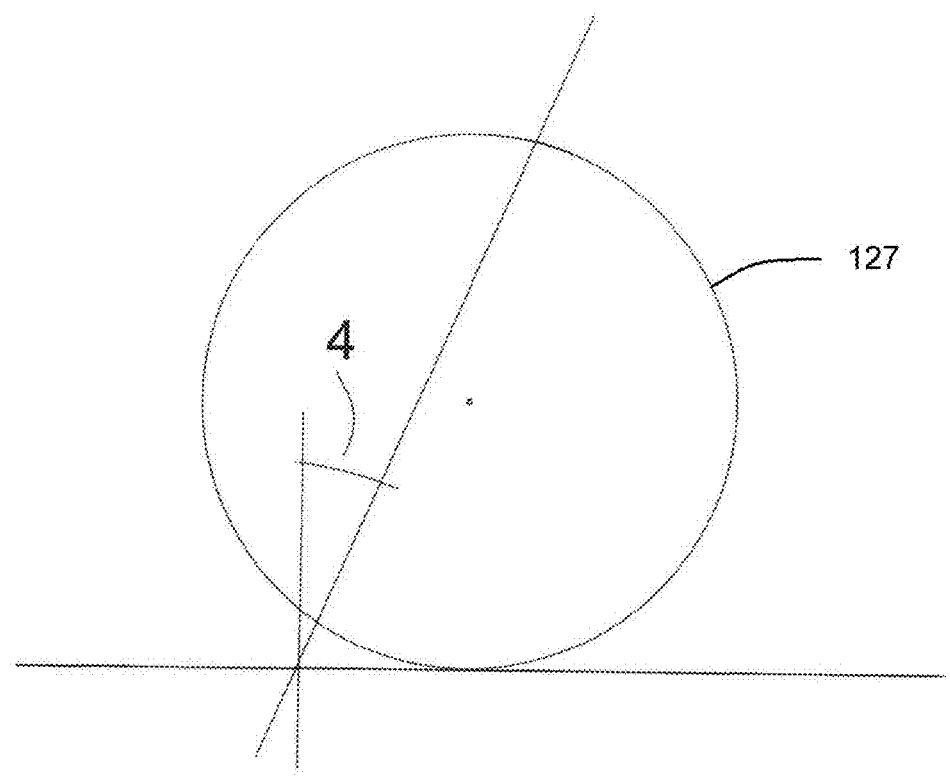
FIG. 2 illustrates a caster angle (4).

The invention provides a feedback torque actuator control device for a front wheel drive steering system of a vehicle, comprising:
  a column axle;
  a steering wheel connected to the column axle;
  an electronic control unit (ECU) (14);
  a feedback torque actuator connected to the column axle and being in communication with the ECU (14);
  a torsion bar connected to the column axle;
  a speed sensor (8), (10) for measuring a speed of the vehicle and being in communication with the ECU (14);
  an angle sensor (12) for measuring a steering angle, the angle sensor (12) being in communication with the ECU (14);
  an assistance actuator (140) connected below the feedback torque actuator (130) on the column axle and being in communication with the ECU (14), wherein the assistance actuator (140) is configured to remove external steering wheel torque from the steering wheel;
  a transformation and control unit (16) configured to prepare at least one input signal from the speed sensor (8), (10), and/or angle sensor (12) for input to controller (22) and/or actuator, wherein the transformation and control unit (16) is in communication with the ECU (14);
  the ECU (14) is configured for controlling a feedback torque;
  the ECU (14) is configured for determining a steering angle to a target steering-wheel torque;
  the ECU (14) is configured for determining a feedback torque error; and
  the ECU (14) is configured for minimizing the feedback torque error as a change in a steering-wheel feedback torque, wherein the ECU (14) is configured to control the feedback torque actuator to provide the target steering-wheel torque to the steering wheel such that the target steering-wheel torque provides a feel of the external steering wheel torque while removing torque steer and kickbacks, wherein the target steering-wheel torque is based on a caster angle (4) of a front-wheel suspension (2).

The invention also provides a vehicle steering system, comprising:
  a linkage between front axle road wheels and a column axle, wherein the linkage includes a steering rack with associated tie rods connected via a pinion to the column axle;
  a steering feedback actuator connected to the column axle and having an assistance motor (20) and an electric control unit (ECU) (14) for giving feedback to a vehicle driver;
  a steering wheel connected to the column axle to which the vehicle driver applies a driver torque;
  an electronic control unit (ECU) (14);
  a feedback torque actuator connected to the column axle and being in communication with the ECU (14);
  a torsion bar connected to the column axle;
  a speed sensor (8), (10) for measuring a speed of the vehicle and being in communication with the ECU (14);
  an angle sensor (12) for measuring a steering angle, the angle sensor (12) being in communication with the ECU (14);
  an assistance actuator (140) connected below the feedback torque actuator (130) on the column axle and being in communication with the ECU (14), wherein the assistance actuator (140) is configured to remove external steering wheel torque from the steering wheel;
  a transformation and control unit (16) that prepares at least one input signal from the speed sensor (8), (10), and/or angle sensor (12) for input to a controller (22) and/or actuator;
  the ECU (14) is configured for a feedback torque;
  the ECU (14) is configured for determining a steering angle to a target steering-wheel torque;
  the ECU (14) is configured for determining a feedback torque error; and
  the ECU (14) is configured for minimizing the feedback torque error as a change in steering-wheel feedback torque, wherein the ECU (14) is configured to control the feedback torque actuator to provide the target steering-wheel torque to the steering wheel such that the target steering-wheel torque provides a feel of the external steering wheel torque while removing torque steer and kickbacks, wherein the target steering-wheel torque is based on a caster angle (4) of a front-wheel suspension.

The present invention for controlling a feedback torque actuator (130) in a steering system (100) is based on the fact that it incorporates a series of steps for an assistance actuator control and a series of steps for a feedback torque control.

In this embodiment, the assistance actuator (140, see page 5) incorporates the following step:
1. One very important aspect of the current embodiment is the fact that the assistance actuator is given a very high gain resulting in the fact that the torque in the column axle (135) above this assistance actuator will become very low. In the case of very high gain (or steep boost curve), the assistance will be high, and with high assistance, the resulting torque above the assistance actuator will be very low.

In this embodiment, the feedback torque actuator (130, see page 5) incorporates the following steps:
1. Measurement of at least one input signal with the aid of a sensor. The following signals is preferably needed:
   The vehicle speed is calculated from information achieved by using either standard wheel speed sensors (8) (so called ABS sensors) or a drive axle speed sensor (10). In the case of wheel speed sensors (8), the vehicle speed can be calculated from the speeds of the wheels of the non-driven axle as a mean value or in the case of all-wheel drive, more advanced methods are needed, but well known for the person skilled in the art. In the case of a drive axle speed sensor, the vehicle speed is simply the drive axle speed times the ratio between the drive axle and the wheel speed. Such a drive axle speed based vehicle speed should be compensated for wheel spin in the case of using more power than the tire-to-road friction can take.
   The steering angle is measured by the use of an angle sensor (12) located somewhere in the steering column or if located elsewhere in the steering system it should be translated to the steering column coordinate system by using the ratio between the sensor position and the column.
2. By the use of the before-mentioned sensors, the steering angle and the vehicle speed is calculated.
3. In a third step of the present invention, the steering angle and the vehicle speed is used to achieve a target steering-wheel torque. The target steering wheel torque, as defined before the brief description of the figures, is calculated using mathematical models.
   As an example of a method in accordance with the invention, the target steering-wheel torque includes one or more of the following torque contributions: lateral acceleration feedback torque, steering system friction torque, tyre friction torque, damping torque and steering-wheel self-alignment torque.
4. Control of the mentioned feedback torque actuator via a closed loop current control to achieve said target steering-wheel torque. Here, the target steering-wheel torque is first transformed to a target motor current, and this target motor current is compared with a measured motor current, where the difference between the two will form a control error. A controller (22) is then used to minimize this control error to achieve the target current to the motor (20) and hence the target steering-wheel torque.

In this way, the target steering-wheel torque is achieved without any disturbances. The steering column will also be stiff from the fact that only one torsion bar is used. And finally, the complexity of the system will be low, and hence the cost will be lower than normally.

The tyre friction torque takes into consideration the wheel angle, wheel angle history, vehicle position and vehicle velocity, which is important in the case of a low vehicle velocity, since the tyre contact changes more quickly than the twisting of the tyre at high velocities. The steering system friction torque takes into consideration the fact that the steering system needs to have a certain friction for the driver to be able to rest against, so that the whole steering torque does not have to be given by the driver. A certain hysteresis is also needed so that the car is not felt to be "wobbly" or "unruly". The damping torque provides an important damping of the steering angle and thereby the vehicle response. Different damping outwards or inwards when driving straight ahead and when cornering can be preferable so that the damping will match the torque level and gradient. The steering-wheel self-alignment torque means the steering-wheel goes back to the straight-forward position also at velocities so low that there is no yaw and/or lateral vehicle state feedback. The steering-wheel self-alignment torque can be an interpolation table or a software function.

As an example of a method in accordance with the invention, the target steering-wheel torque is a function of one or more of the following variables: vehicle speed, steering angle, steering angle velocity and/or steering angle acceleration.

In this way, the parameters included in the target steering-wheel torque can be assessed in the event of a desired change in a vehicle state.

In a second embodiment of the present invention, the before-mentioned assistance actuator is removed. On the other hand, in order to achieve as low torque in the column axle as possible, the front-wheel suspension (2) of the steering system is arranged in such a way that the steering forces are as low as possible. This is made by using zero caster (4) angle or a negative caster angle (4), so that the side forces of the wheels will not result in any steering system forces.

Steering feel is achieved in the same way as in the first embodiment.

In a third embodiment, the before-mentioned, from both the first and second embodiment, methods for achieving low torques in the column axle (135) is compensated in the following way. The column axle torque will, if either the assistance actuator gain is not great enough or the caster angle (4) is not possible so set as low as needed, deviate from zero. In order to minimize the effect of such deviation a compensation torque is in this embodiment introduced. This compensation torque is calculated by the use of a mathematical model with the same components as the model that is used for the target steering-wheel torque. Hence, lateral acceleration induced torque deviations, friction induced ones, damping induced ones as well as returnability induced ones will be compensated for. By the use of this compensation torque, the target steering-wheel torque is achieved without any disturbances. The steering column will also be stiff from the fact that only one torsion bar is used. And finally, the complexity of the system will be low, and hence the cost will be lower than normally.

In a fourth embodiment, the assistance actuator can be such that the connection and assistance actuation is achieved via a fluid. Here follows a list of such type of assistance actuators:

In the case of an Orbitrol valve there is no direct mechanical connection between the steering member and the steering wheel In the case of an electrically or mechanically actuated hydraulic valve such as e.g. a 4/3 proportional valve or combinations of 3/3 proportional valves.

Or other valve combinations achieving the same result as the two examples described above.

All these examples of assistance actuators can in combination with embodiment one and three build a full set of combinatory embodiments.

In a fifth embodiment, the steering angle can be calculated in several ways, where they all have in common that they consists of an angle somewhere in the steering system that can be used to influence the lateral acceleration or curvature of the vehicle. Such steering angles can be:

The articulation angle of an articulated vehicle.

The rear-wheel steering angle in the case of a rear-wheel steered vehicle.

A combination of the front-wheel angle and the rear-wheel angle in the case of an all-wheel steered vehicle.

The front-wheel angle in the case of an assistance actuator described in embodiment four.

All these examples of steering angles can in combination with embodiment one, three and four build a full set of combinatory embodiments.

Still other objects and features of the present invention will be apparent from the detailed description considered in conjunction with the accompanying drawing. It is to be understood, however, that the drawing is designed solely for purposes of illustration and not as a definition of the limits of the invention, for which reference should be made to the appended claims and the description as a whole. It should be further understood that the drawing is not necessarily drawn to scale and that, unless otherwise indicated, it is merely intended to conceptually illustrate the structures and procedures described herein.

The invention claimed is:

1. A method of controlling a feedback torque actuator in a steering system, comprising:
    removing external steering wheel torque from a steering wheel connected to a column axle by using an assistance actuator, wherein the assistance actuator is disposed below the feedback torque actuator on the column axle;
    generating at least one input signal with a sensor of a steering angle;
    determining the steering angle from the at least one input signal;
    transforming the at least one input signal to a target steering-wheel torque; and
    controlling the feedback torque actuator via a closed loop current control to obtain the target steering-wheel torque in the steering wheel, such that the target steering-wheel torque provides a feel of the external steering wheel torque in the steering wheel while removing torque steer and kickbacks from the steering wheel, wherein the target steering-wheel torque in the column axle above the assistance actuator is based on a caster angle of a front-wheel suspension.

2. The method of claim 1, wherein the torque in the column axle above the assistance actuator is further based on a gain of the assistance torque actuator.

3. The method of claim 1, wherein the torque in the column axle is compensated for deviation from an ideal torque in the column axle by adding a compensation torque to the target steering-wheel torque, whereby the closed loop current control obtains the target steering-wheel torque.

\* \* \* \* \*